(12) United States Patent
Taraci

(10) Patent No.: US 8,649,519 B2
(45) Date of Patent: Feb. 11, 2014

(54) METHOD AND APPARATUS FOR SECURE DISTRIBUTION OF DIGITAL CONTENT

(75) Inventor: Brian Taraci, Foothill Ranch, CA (US)

(73) Assignee: RGB Systems, Inc., Anaheim, CA (US)

( * ) Notice: Subject to any disclaimer, the term of this patent is extended or adjusted under 35 U.S.C. 154(b) by 398 days.

(21) Appl. No.: 12/862,605

(22) Filed: Aug. 24, 2010

(65) Prior Publication Data

US 2011/0197073 A1 Aug. 11, 2011

Related U.S. Application Data

(60) Provisional application No. 61/240,152, filed on Sep. 4, 2009.

(51) Int. Cl.
*H04K 1/00* (2006.01)

(52) U.S. Cl.
USPC .............................. 380/258; 380/47; 713/155

(58) Field of Classification Search
None
See application file for complete search history.

(56) References Cited

U.S. PATENT DOCUMENTS

| | | | |
|---|---|---|---|
| 7,885,273 B2 * | 2/2011 | Lee et al. | 370/401 |
| 8,161,172 B2 * | 4/2012 | Reisman | 709/228 |
| 8,171,085 B1 * | 5/2012 | Tevanian, Jr. | 709/206 |
| 2002/0120847 A1 | 8/2002 | Kamperman | |
| 2003/0110378 A1 | 6/2003 | Yamada | |
| 2003/0218534 A1 | 11/2003 | LaCous | |
| 2006/0173787 A1 | 8/2006 | Weber | |
| 2007/0147396 A1 | 6/2007 | Lee et al. | |
| 2008/0005310 A1 | 1/2008 | Xu et al. | |
| 2008/0232588 A1 * | 9/2008 | Christison | 380/270 |

OTHER PUBLICATIONS

International Searching Authority, Int'l Preliminary Report on Patentability, Mar. 6, 2012, int'l app. No. PCT/US2010/002385.

* cited by examiner

*Primary Examiner* — Pramila Parthasarathy
(74) *Attorney, Agent, or Firm* — The Hecker Law Group, PLC

(57) ABSTRACT

A method and apparatus for secure distribution of digital content is provided. In accordance with at least one embodiment, an intermediate device maintains an authorized content sink list which it uses to allow reauthorization of a first content sink for access to first content from a first content source when the first content sink has a first content sink entry on the authorized content sink list. In accordance with at least one embodiment, reauthorization is conditioned upon a first content sink entry currency status having not yet expired. In accordance with at least one embodiment, the intermediate device allows authentication of the first content sink by the first content source when no first content sink entry exists on the authorized content sink list or when the first content sink entry currency status has expired.

13 Claims, 8 Drawing Sheets

_US 8,649,519 B2_

METHOD AND APPARATUS FOR SECURE DISTRIBUTION OF DIGITAL CONTENT

CROSS-REFERENCE TO RELATED APPLICATION

This patent application claims the benefit of U.S. Provisional Patent Application Ser. No. 61/240,152 entitled "Method and Apparatus for Secure Distribution of Digital Content" filed Sep. 4, 2009 which is incorporated by reference in its entirety herein.

BACKGROUND OF THE INVENTION (1) Field of the Invention

The invention relates generally to digital rights management and more particularly to securely distributing digital content.

(2) Description of the Related Art

Various content protection schemes have been devised. One example is High-bandwidth Digital Content Protection (HDCP). HDCP cryptographically manages transmission of content from a HDCP content source to a HDCP content sink. A HDCP-compliant device should contain forty 56-bit confidential cryptographic keys and use a 40-bit key selection vector (KSV) to assist with key selection. However, HDCP imposes a limit on the size of the KSV first-in-first-out (FIFO) buffer in HDCP-compliant devices. Also, some HDCP-compliant devices do not support repeaters or otherwise limit the number of KSVs supported. The inability to support repeaters can impose undesirable constraints on system topologies.

Furthermore, HDCP limits the levels of HDCP-compliant devices that may be interconnected to seven. Latency increases as the number of levels increases, and the seven-level limit allows passing KSVs from across all seven levels within a five-second time-out limit. The seven-level limit thereby also imposes constraints on system topologies.

Adding a new device downstream from a content source forces reauthentication of HDCP content sinks, which introduces an interruption of any content being provided to those HDCP content sinks. Thus, seamless reconfiguration of a system topology is not presently possible.

Layered switching causes new devices to appear, which, as described above, can force reauthentication of HDCP content sinks. Thus, switching devices can cause system-wide interruption of content just by their presence and operation in a system.

Limited interface speeds, such as limited inter-integrated-circuit (IIC) interface speeds, delay large KSV lists, which can increase latency to an extent where prescribed time-out periods area exceeded. Such increases in latency can constrain system topologies.

Switching color spaces and/or sampling requires reauthentication of HDCP content sinks, which, as noted above, causes content to be interrupted not only for HDCP content sinks that are switching color spaces and/or sampling but also for other content sinks receiving the same content.

Thus, a technique for securely and reliably distributing content over a complex system topology is needed.

BRIEF DESCRIPTION OF THE SEVERAL VIEWS OF THE DRAWINGS

The present invention may be better understood, and its features made apparent to those skilled in the art by referencing the accompanying drawings.

The use of the same reference symbols in different drawings indicates similar or identical items.

DETAILED DESCRIPTION OF THE INVENTION

Figure 1A:
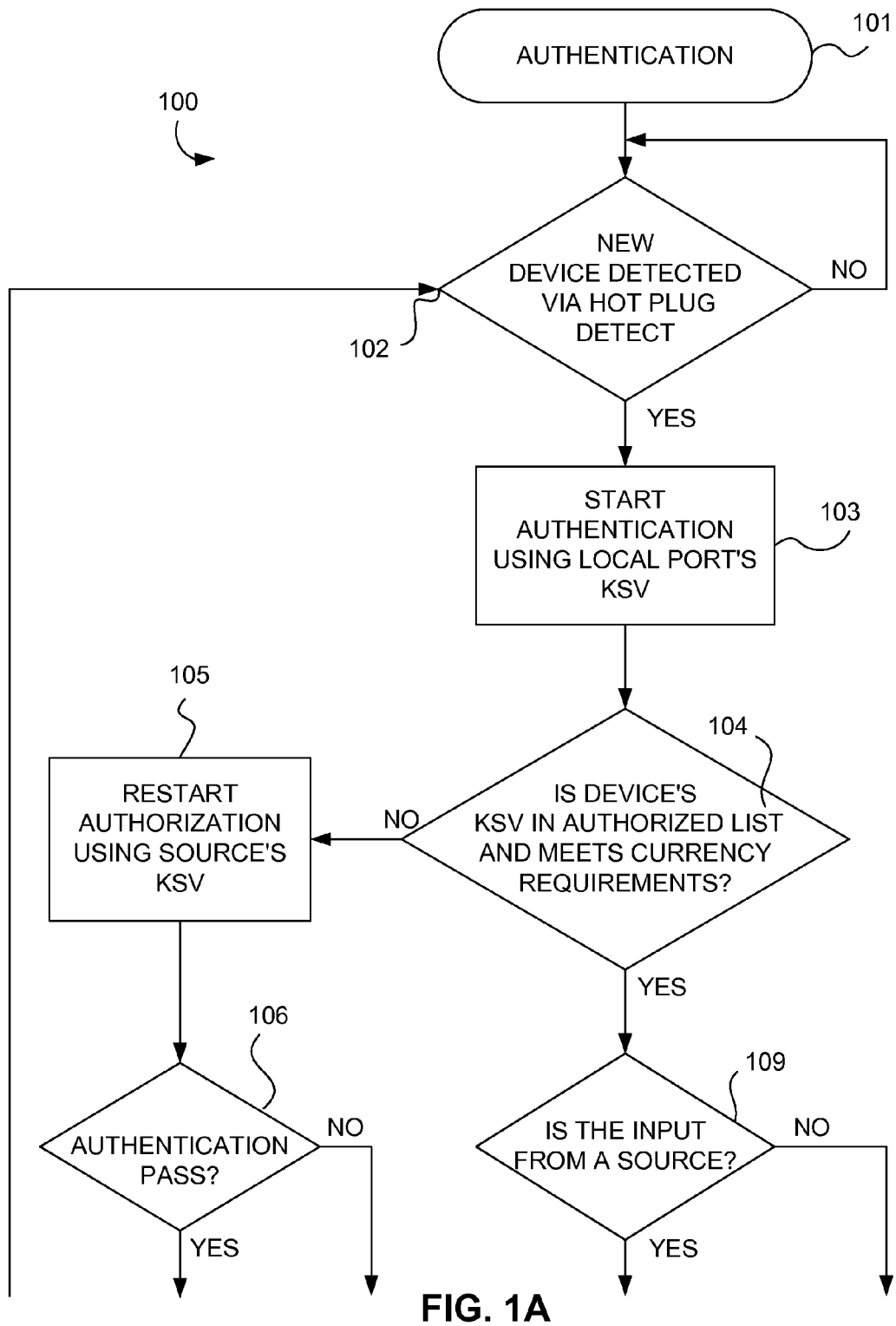
FIG. 1 is a flow diagram illustrating a method in accordance with at least one embodiment.

A method and apparatus for secure distribution of digital content is provided. In accordance with at least one embodiment, an intermediate device maintains an authorized content sink list which it uses to allow reauthorization of a first content sink for access to first content from a first content source when the first content sink has a first content sink entry on the authorized content sink list. In accordance with at least one embodiment, reauthorization is conditioned upon a first content sink entry currency status having not yet expired. In accordance with at least one embodiment, the intermediate device allows authentication of the first content sink by the first content source when no first content sink entry exists on the authorized content sink list or when the first content sink entry currency status has expired.

In accordance with at least one embodiment, cryptographic authentication, for example, KSV checks, can be performed at some or all lower levels in a multi-level system. In accordance with at least one embodiment, an intermediate device coupled to a content source and a content sink can receive and process system renewability messages (SRMs) instead of requiring the content source to receive and process all SRMs. In accordance with at least one embodiment, the intermediate device can build a KSV list by passively watching authentication with each endpoint. For example, if the intermediate device observes that a KSV from a content sink has been authenticated by an authentication process of a content source, the intermediate device can add that KSV to an authorized KSV list.

In accordance with at least one embodiment, the intermediate device processes or monitors KSVs one at a time as normal interaction between content sources and content sinks occurs over time. In accordance with at least one embodiment, the intermediate device processes or monitors KSVs in groups based on the number of KSVs a product supports.

In accordance with at least one embodiment, during "inactive" times, either scheduled or detected KSVs in the authorized KSV list can be cycled through in a sequence, for example, round robin order, to be verified by the content source. In accordance with at least one embodiment, the date and time of the last validation can be stored in case there is a time requirement that needs to be met. In accordance with at least one embodiment, a forced reauthorization by the source can be used to flag a "potentially" new SRM.

In accordance with at least one embodiment, once one or more valid KSVs are determined, they can be sent throughout the system so local validation can be done quickly (e.g., with some higher speed, more robust protocol) and stored in non-volatile memory. Because authentication can be done locally, latency that otherwise leads to a time-out situation that limits the number of device levels a system may contain is no longer an issue. Moreover, the "system" can be treated as a single level. In accordance with at least one embodiment, color space changes, resampling, and/or audio processing can be done so no reauthentication is required to support different sinks.

In accordance with at least one embodiment, during a time the "system" is in a passive authentication mode, any affected downstream sinks show an "authentication in progress" message. In accordance with at least one embodiment, the interconnection between system blocks can be any form of media, for example, high definition multimedia interface (HDMI) or a display port on wired or wireless media, proprietary high speed digital data on unshielded twisted pair (UTP) cabling or shielded twisted pair (STP) cabling, with the functionality being independent of the media. In accordance with at least one embodiment, an initial "learn" mode can be used to authenticate all downstream devices to prevent interruptions during use.

In accordance with at least one embodiment, authentication is allowed to occur at the lower levels of a system network instead of requiring the passing of authentication information up to the source. Lower level authentication allows the sink devices to operate independently of interaction with sources and repeaters. In accordance with at least one embodiment, such lower level authentication can be accomplished by allowing sink devices to have access to messages such as SRMs that contain device authentication/revocation information (i.e. blacklists).

In accordance with at least one embodiment, sink devices are allowed to have access to SRMs. In accordance with at least one embodiment, intermediate devices check each sink device, over time, with the content source and see if the corresponding sink device is valid. Such checking creates, over time, a list of good keys (which can be time stamped to force another check of those keys within a finite time). In accordance with at least one embodiment, authentication is done in the background so that devices don't get disabled while that authentication is performed over time. Eventually the SRMs are propagated down to the sink devices.

Figure 1B:
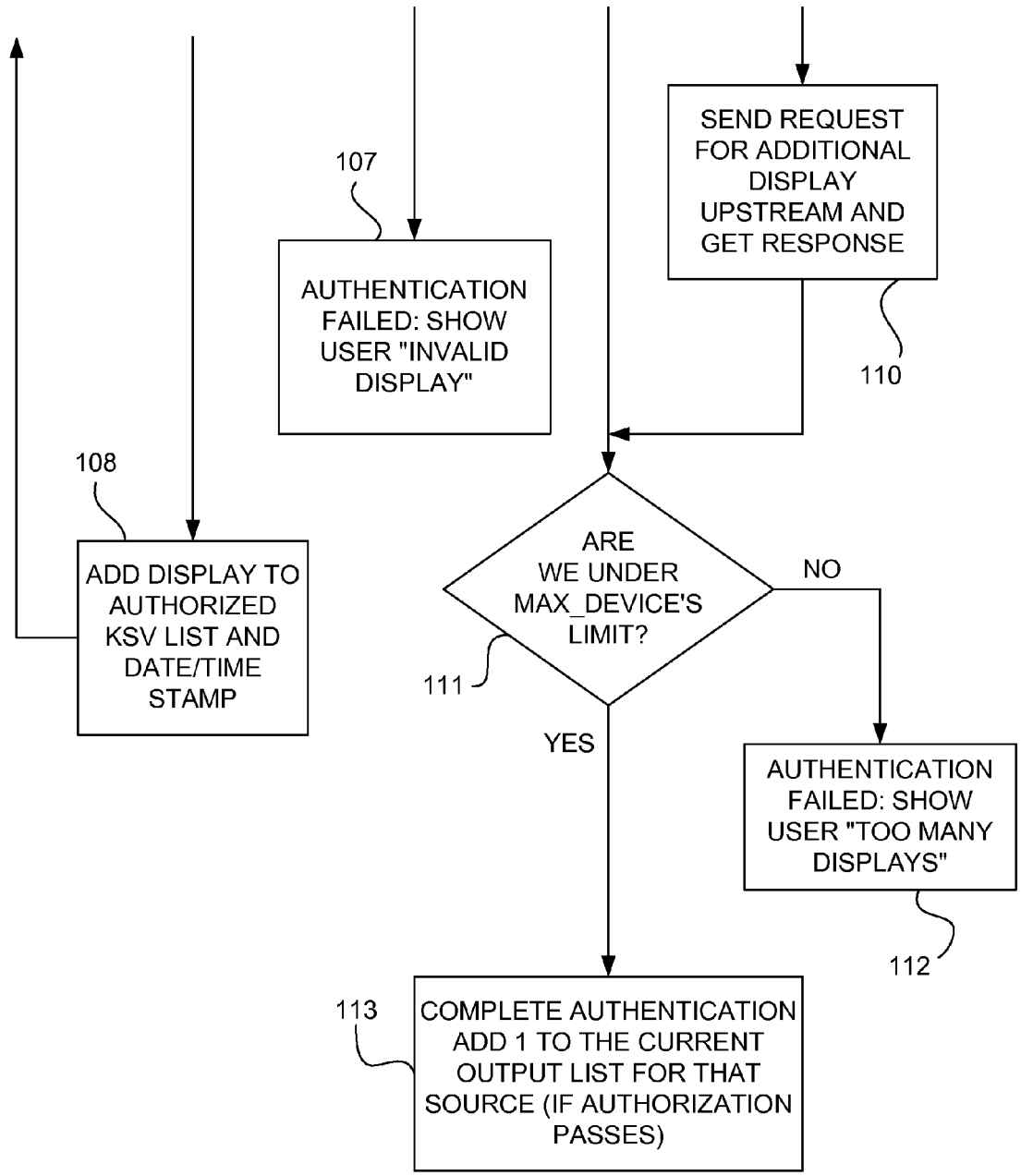

FIG. 1 is a flow diagram illustrating a method in accordance with at least one embodiment. Method 100 comprises steps 101 through 113. Method 100 begins in step 101. From step 101, the method continues to step 102. In step 102, a determination is made as to whether or not a new device is detected via a hot plug detect. If not, the method returns to step 102. If so, the method continues to step 103. In step 103, authentication is started using a local port cryptographic public key information element, for example, a local port KSV. From step 103, the method continues to step 104. In step 104, a determination is made as to whether or not a device's KSV is included in an authorized KSV list and meets authorized KSV currency requirements. If not, the method continues to step 105. If so, the method continues to step 109.

In step 105, authorization is restarted using a source cryptographic public key information element, for example, a source KSV. In accordance with at least one embodiment, during step 105, the intermediate device between the source and destination acts like a connection medium between the source and destination, capable of passively monitoring the authentication transaction between the source and destination. For example, the intermediate device can monitor the destination KSV sent to the source for authentication and the completion of authentication as denoted by an encryption enable (ENC_EN) signal from the source following successful authentication of the destination by the source. From step 105, the method continues to step 106. In step 106, a determination is made as to whether or not authentication passes (i.e., authentication is successful). If not, the method continues to step 107. If so, the method continues to step 108. In step 107, an indication is provided that authentication failed, for example, an "invalid display" message is shown to a user. In step 108, the display is added to the authorized KSV list and the authorized KSV list entry is stamped with a date and time stamp to allow determination of whether or not authorized KSV currency requirements are met. From step 108, the method returns to step 103.

In step 109, a determination is made as to whether or not the input is from a source. If not, the method continues to step 110. If so, the method continues to step 111. In step 110, a request for additional display is sent upstream and a response to the request is received. From step 110, the method continues to step 111. In step 111, a determination is made as to whether or not the number of devices to be sourced by the source is less than a MAX_DEVICES limit, which denotes a maximum number of devices that may be sourced by a source. If not, the method continues to step 112. If so, the method continues to step 113. In step 112, an indication that authentication failed is provided, for example, a "too many displays" message is shown to a user. In step 113, authentication is completed, for example, the device is added to a current output list for the source for which it has been authenticated (if the authentication passes). Following step 113, the method ends (or returns to step 102 so that additional new devices can be detected and authenticated).

Figure 2:
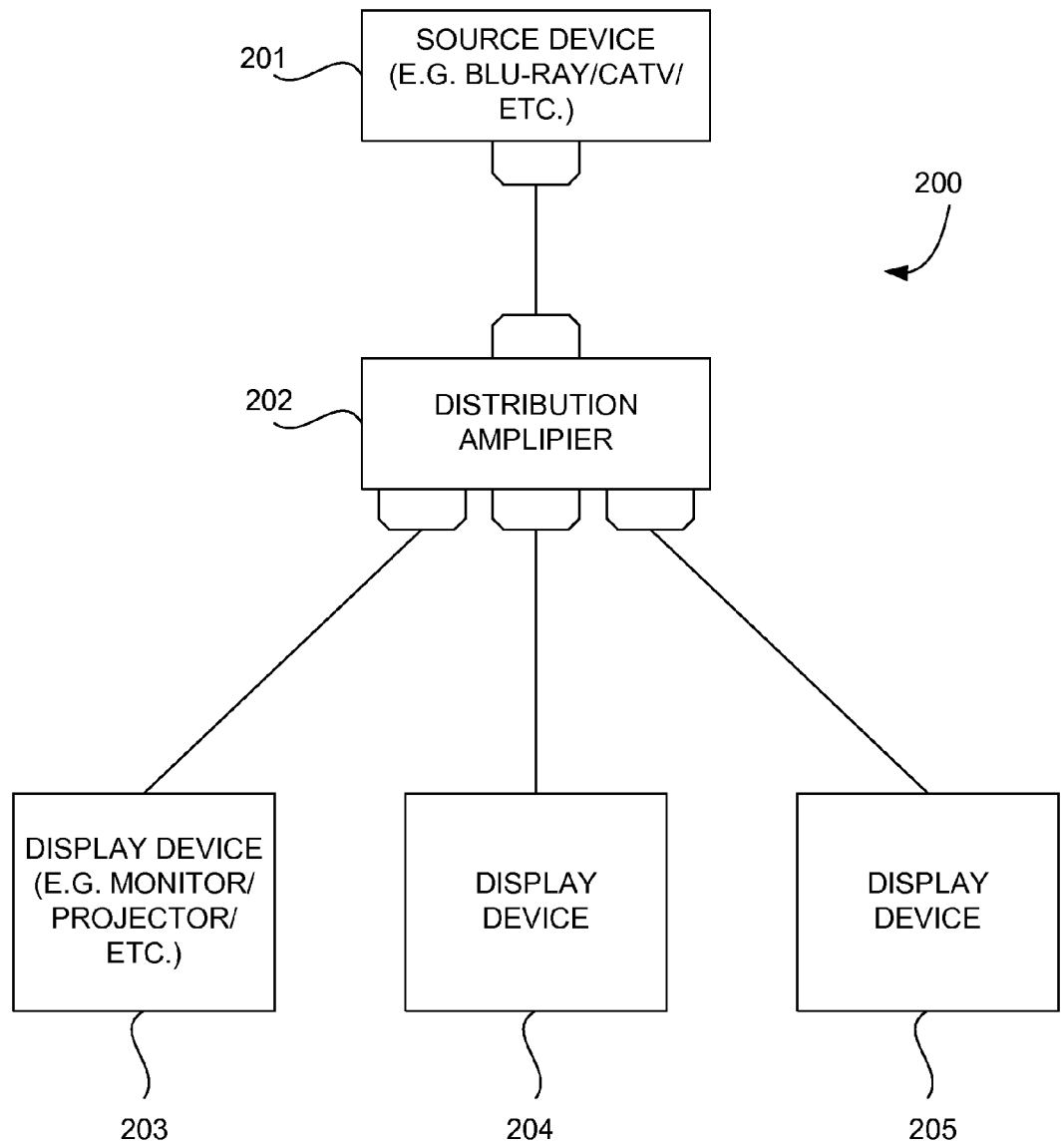
FIG. 2 is a block diagram illustrating apparatus in accordance with at least one embodiment.

FIG. 2 is a block diagram illustrating apparatus in accordance with at least one embodiment. Apparatus 200 comprises source device 201, distribution amp 202, display device 203, display device 204, and display device 205. Source device 201 is coupled to distribution amplifier 202. Distribution amplifier 202 is coupled to display device 203, display device 204, and display device 205. Source device 201 serves as a source of digital content, such as digital video, and may, for example, be a blu-ray video player, cable television (CATV), satellite television (TV), over-the-air broadcast television (TV), a display port on a computer, etc. Distribution amplifier 202 distributes the content from source device 201 to display devices 203-205 via suitable interfaces, such as HDMI, Display Port, etc., on the inputs and outputs of distribution amplifier 202. While distribution amplifier 202 may attenuate the signals carrying the content, distribution amplifier 202 may also amplify the signals so that the signals present the outputs of distribution amplifier 202 are provided at suitable signal levels. Display devices 203-205 have suitable interfaces, such as HDMI, display ports, etc. on their inputs and may be any type of display devices, for example, monitors, projectors, etc.

Figure 3:
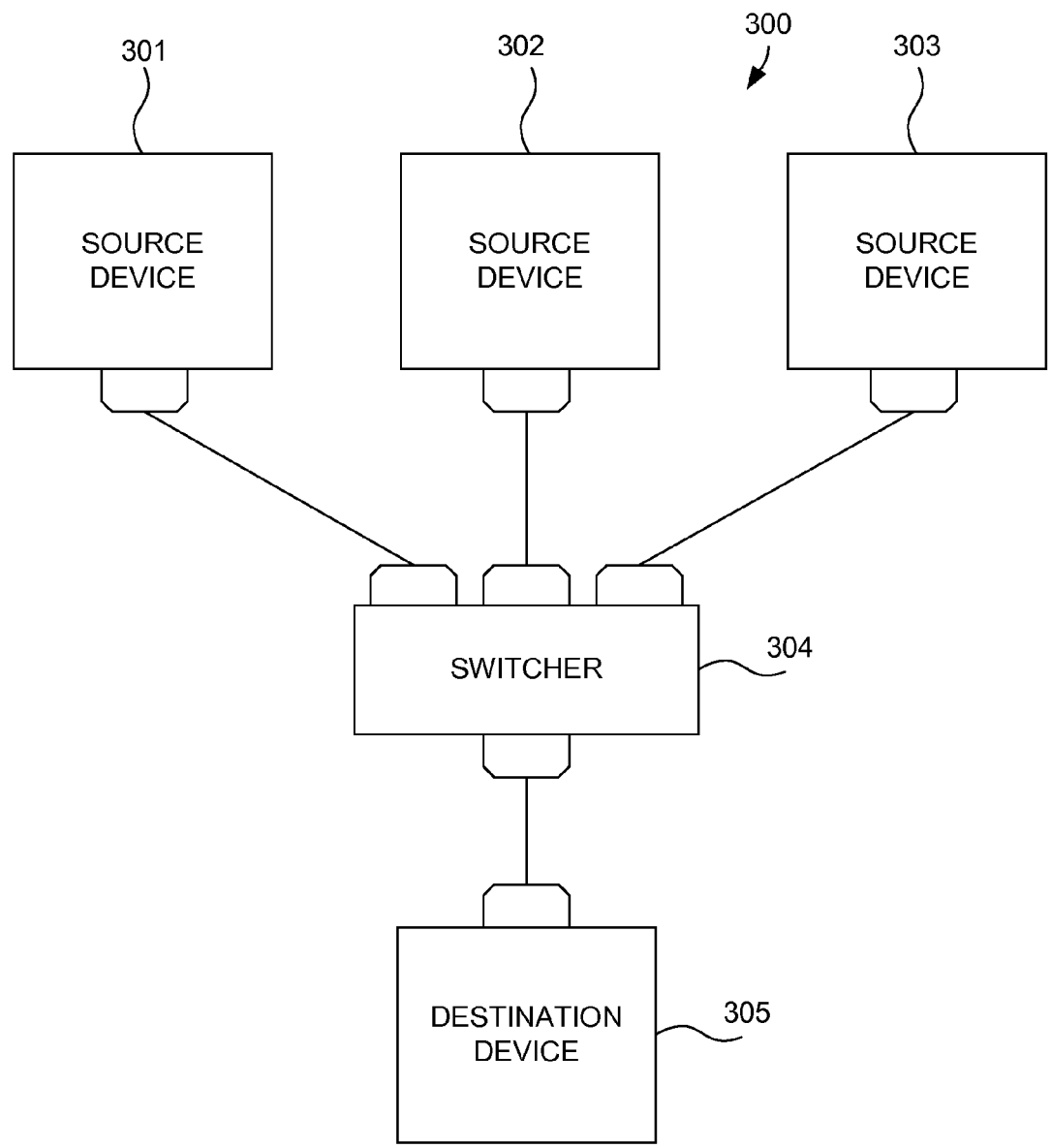
FIG. 3 is a block diagram illustrating apparatus in accordance with at least one embodiment.

FIG. 3 is a block diagram illustrating apparatus in accordance with at least one embodiment. Apparatus 300 comprises source device 301, source device 302, source device 303, switcher 304, and destination device 305. In accordance with at least one embodiment, a plurality of source devices 301-303 provide a plurality of streams of content to switcher 304, which forwards the plurality of streams of content to destination device 305.

Figure 4:
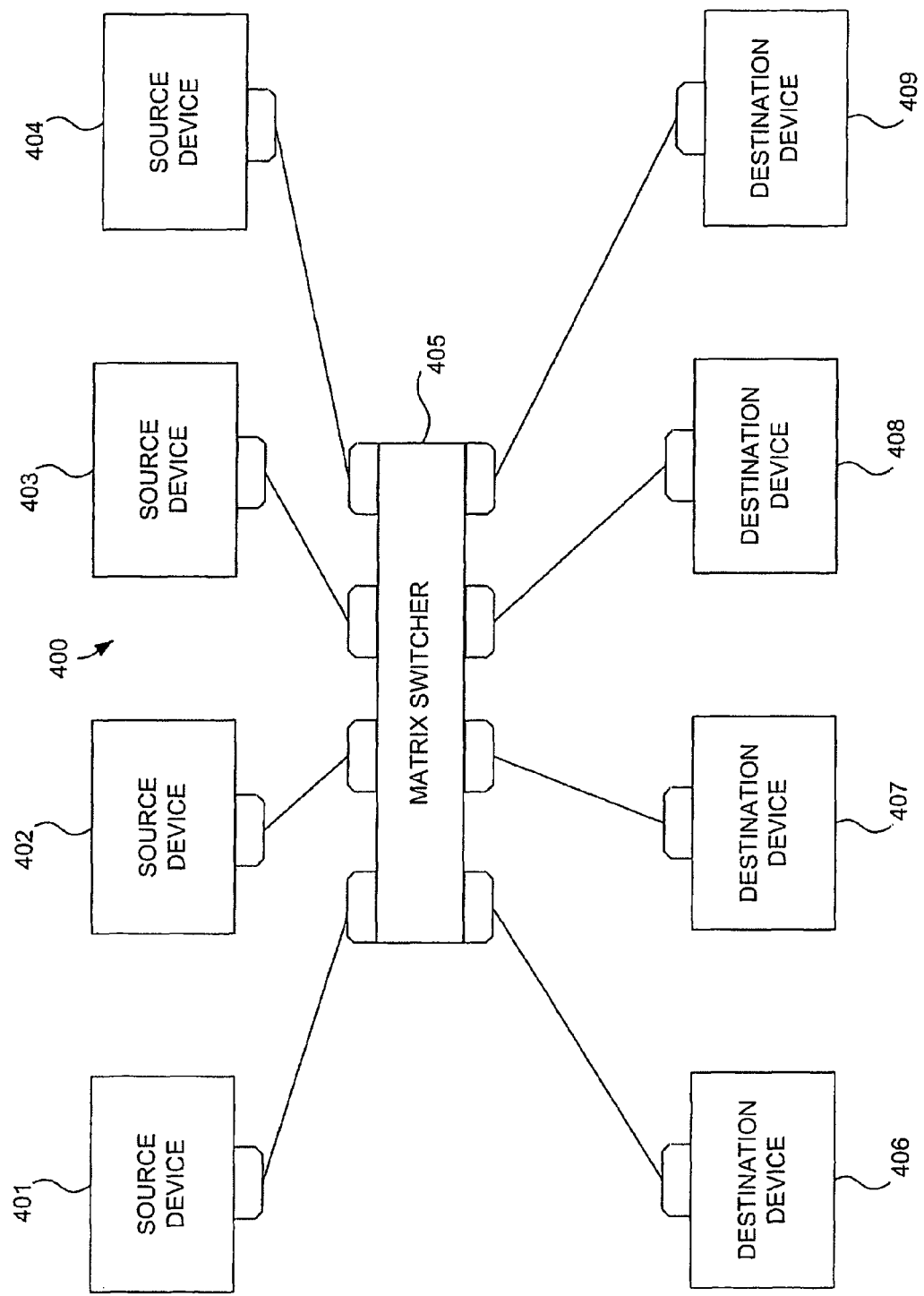
FIG. 4 is a block diagram illustrating apparatus in accordance with at least one embodiment.

FIG. 4 is a block diagram illustrating apparatus in accordance with at least one embodiment. Apparatus 400 comprises source device 401, source device 402, source device 403, and source device 404. Apparatus 400 also comprises matrix switcher 405. Apparatus 400 further comprises destination device 406, destination device 407, destination device 408, and destination device 409. Source devices 401-404 are coupled to matrix switcher 405, and matrix switcher 405 is coupled to destination devices 406-409. Matrix switcher 405 can couple streams of content from any or all of source devices 401-404 to any or all of destination devices 406-409.

Figure 5:
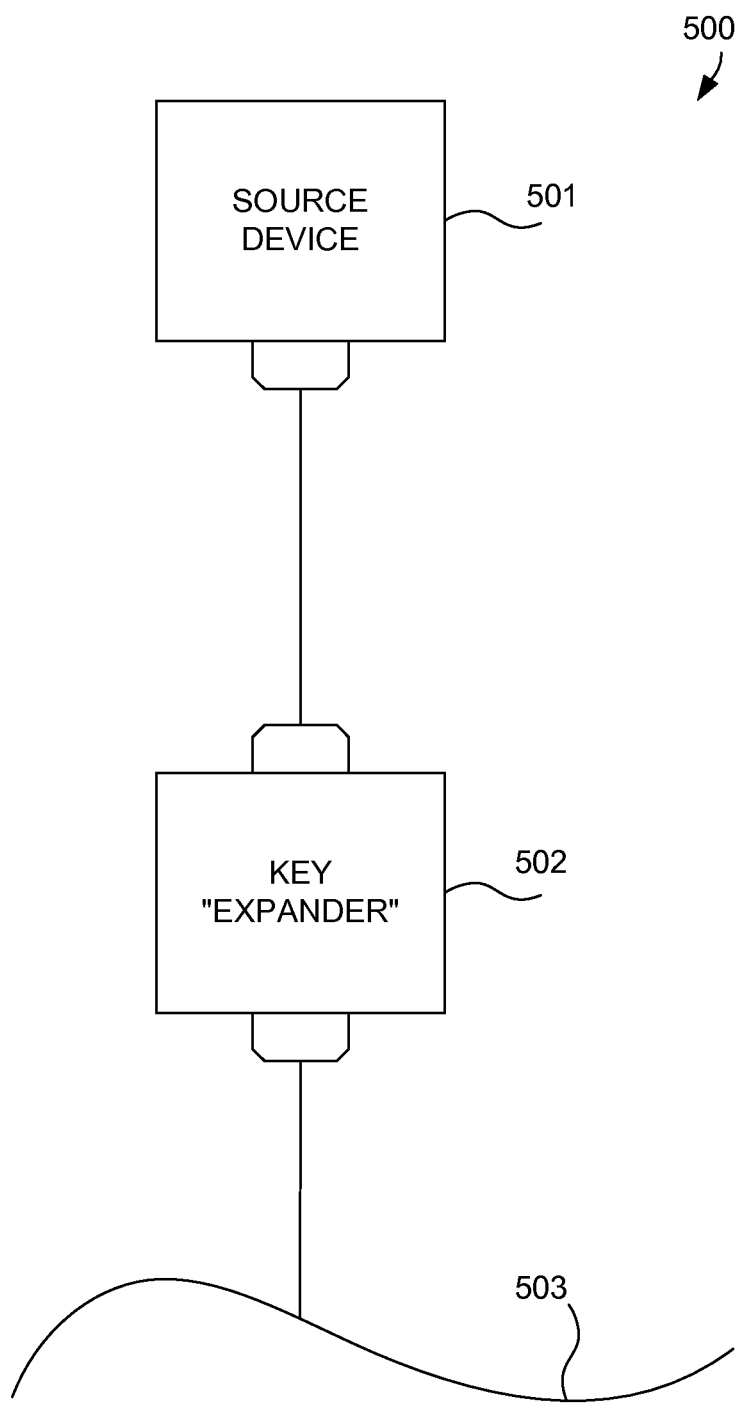
FIG. 5 is a block diagram illustrating apparatus in accordance with at least one embodiment.

FIG. 5 is a block diagram illustrating apparatus in accordance with at least one embodiment. Apparatus 500 comprises source device 501, key expander 502, and other device or devices 503. Other device or devices 503 can be any combination of devices, for example, repeaters, distribution amplifiers (DAs), switches, and/or displays.

Figure 6A:
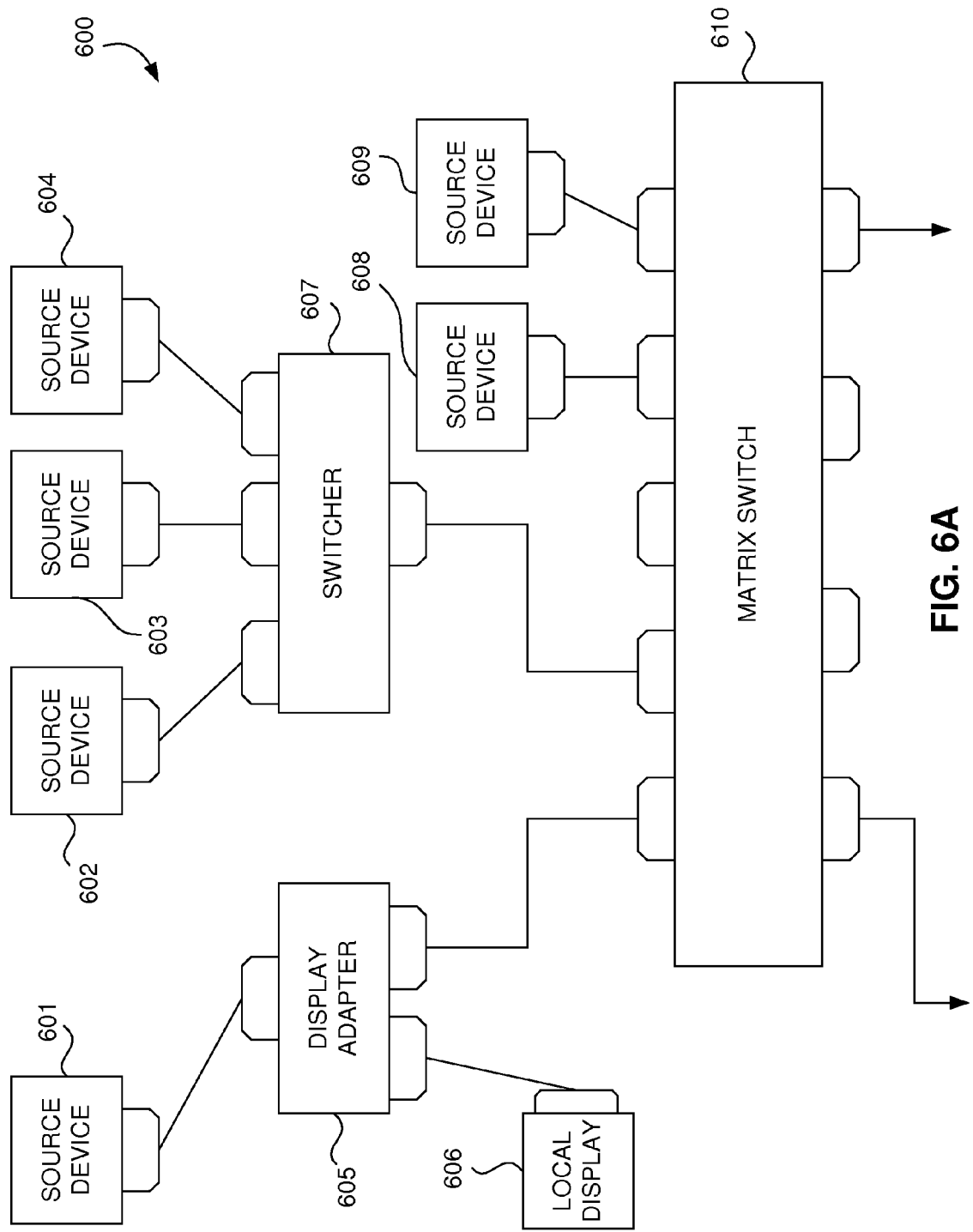
FIG. 6 is a block diagram illustrating apparatus in accordance with at least one embodiment.
Figure 6B:
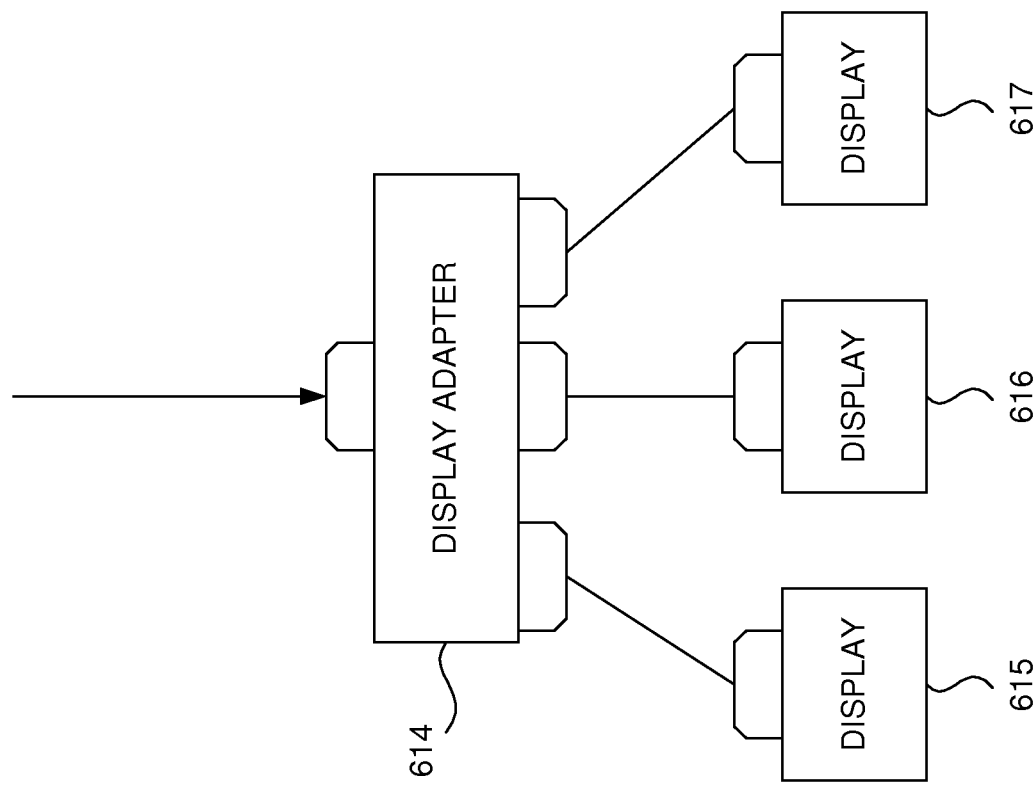
Figure 6B:
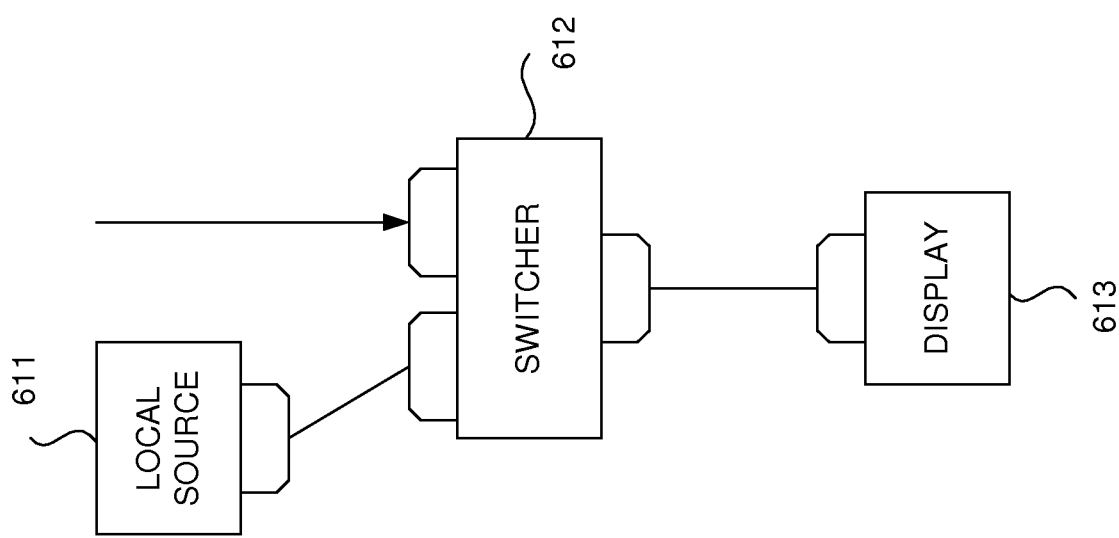

FIG. 6 is a block diagram illustrating apparatus in accordance with at least one embodiment. Apparatus 600 comprises source device 601, source device 602, source device 603, source device 604, display adapter 605, local display 606, switcher 607, source device 608, source device 609, matrix switch 610, local source 611, switcher 612, display 613, display adapter 614, display 615, display 616, and display 617. Source device 601 is coupled to display adapter 605, which is coupled to local display 606 and to matrix switch 610. Content from source device 601 can be displayed on local display 606 and/or can be switched by matrix switch 610 to various other devices, for example, display 613 via switcher 612 and/or any or all of displays 615-617 via display adapter 614. Source device 602, source device 603, and source device 604 are coupled to switcher 607, which is coupled to matrix switch 610. Switcher 607 can switch content from any of source devices 602-604 into an input of matrix switch 610, which can switch the content to any or all of various devices, for example, display 613 via switcher 612 and/or any or all of displays 615-617 via display adapter 614. Source device 608 and source device 609 are coupled to matrix switch 610. Matrix switch 610 can switch content streams from either or both of source devices 608 and 609 to any or all of various devices, such as display 613 via switcher 612 and/or any or all of displays 615-617 via display adapter 614.

In accordance with at least one embodiment, a method comprises receiving first cryptographic public key information from a first content sink at an intermediate device; forwarding the first cryptographic public key information to a first content source; monitoring a first authentication response from the first content source; obtaining first authentication information based on the first authentication response; storing the first authentication information as stored first authentication information; and using the stored first authentication information for reauthorization of the first content sink. In accordance with at least one embodiment, using the stored first authentication information for reauthorization of the first content sink further comprises, when a currency status of the first authentication information is current, using the stored first authentication information; and when the currency status of the first authentication information is expired, once again performing the forwarding of the first cryptographic public key information to the first content source.

In accordance with at least one embodiment, the method further comprises determining if input is from the first content source; and when the input is not from the first content source, sending a request on behalf of the first content sink upstream. In accordance with at least one embodiment, the method further comprises determining if authorization of the first content sink would exceed a maximum number of authorized content sinks; and if the authorization of the first content sink would not exceed the first number of authorized content sinks, completing the authorization of the first content sink.

In accordance with at least one embodiment, the method further comprises, when the authorization of the first content sink would exceed the first number of authorized content sinks, refusing the authorization of the first content sink. In accordance with at least one embodiment, the method further comprises, when authorization of the first content sink has been completed, passing a content stream from the first content source to the first content sink.

In accordance with at least one embodiment, a method comprises detecting a new device using hot plug detection; starting authentication using local port cryptographic public key information; determining if first device cryptographic public key information is in an authorized list and if first device cryptographic public key information meets currency requirements; if the first device cryptographic public key information is in the authorized list and meets currency requirements, determining if input is from a source; if the first device cryptographic public key information is in the authorized list and meets currency requirements and the input is from the source, determining if a maximum number of devices has been exceeded; if the first device cryptographic public key information is in the authorized list and meets currency requirements, the input is from the source, and the maximum number of devices has not been exceeded, completing authorization and adding the first device cryptographic public key information to a current output list for the source. In accordance with at least one embodiment, the method further comprises, when the first device cryptographic public key information is not in the authorized list or does not meet currency requirements, restarting authorization using a source cryptographic public key information. In accordance with at least one embodiment, the method further comprises, when the first device cryptographic public key information is not in the authorized list or does not meet currency requirements, determining if authorization passes.

In accordance with at least one embodiment, when the first device cryptographic public key information is not in the authorized list or does not meet currency requirements and when authorization passes, the method comprises adding the new device to the authorized list and stamping a new device entry in the authorized list with a date and a time. In accordance with at least one embodiment, if the first device cryptographic public key information is not in the authorized list or does not meet currency requirements and when authorization does not pass, the method further comprises indicating the new device is invalid.

In accordance with at least one embodiment, if the first device cryptographic public key information is in the authorized list and meets currency requirements and the input is not from the source, the method further comprises sending a request for an additional upstream device and receiving a response. In accordance with at least one embodiment, if the first device cryptographic public key information is in the authorized list and meets currency requirements, the input is from the source, and the maximum number of devices has been exceeded, the method further comprises indicating that authentication has failed.

In accordance with at least one embodiment, an apparatus comprises an intermediate device adapted to be coupled to a first content source and a first content sink, wherein the intermediate device maintains an authorized content sink list and allows reauthorization of the first content sink for access to first content from the first content source when the first content sink has a first content sink entry on the authorized content sink list and a first content sink entry currency status has not yet expired. In accordance with at least one embodiment, when the first content sink does not have a first content sink entry on the authorized content sink list with a first content sink entry currency status that has not yet expired, the intermediate device monitors authorization of the first content sink by the first content source and, when authorization of the first content sink by the first content source is successful, the intermediate device adds the first content sink entry to the authorized content sink list.

In accordance with at least one embodiment, when the intermediate device adds the first content sink entry to the authorized content sink list, the intermediate device stores expiration data to determine when the first content sink entry currency status has not yet expired. In accordance with at least one embodiment, the intermediate device allows reauthorization of the first content sink for a plurality of cryptographic public key information elements of the first content source. In accordance with at least one embodiment, the intermediate device propagates the first content sink entry to other devices. In accordance with at least one embodiment, the intermediate device stores the authorized content sink list in nonvolatile memory. In accordance with at least one embodiment, the intermediate device acts as a content sink to the first content source, receiving and decrypting content from the first content source using intermediate device cryptographic public key information authenticated by the content source and the intermediate device acts as a content source to the first content sink using first content sink cryptographic public key information.

Thus, a method and apparatus for secure distribution of digital content is described. Although the present invention has been described with respect to certain specific embodiments, it will be clear to those skilled in the art that the inventive features of the present invention are applicable to other embodiments as well, all of which are intended to fall within the scope of the present invention.

What is claimed is:

1. A method of distributing protected content from a first source device to a plurality of sink devices by an intermediate device comprising the steps of:
    obtaining by the intermediate device of authorization from the first source device to receive protected content from the first source device;
    detecting by the intermediate device of a connection of a first sink device to the intermediate device;
    starting authentication of the first sink device by the intermediate device by transmitting first cryptographic public key information of the intermediate device to the first sink device;
    receiving by the intermediate device of second cryptographic public key information of the first sink device from the first sink device;
    determining by the intermediate device whether the second cryptographic public key information of the first sink device is in an authorized list maintained by the intermediate device;
    if the second cryptographic public key information of the first sink device is in the authorized list, completing of the authentication of the first sink device by the intermediate device and providing the protected content by the intermediate device to the first sink device without requiring authentication of the first sink device by the first source device;
    if the second cryptographic public key information of the first sink device is not in the authorized list, ending authentication of the first sink device by the intermediate device, providing by the intermediate device of a connection between the first source device and the first sink device, passively monitoring by the intermediate device of authentication transactions between the first source device and the first sink device, and upon observing authentication of the second cryptographic public key information of the first sink device by the first source device, adding by the intermediate device of the second cryptographic public key information of the first sink device to the authorized list maintained by the intermediate device;
    wherein the step of adding the second cryptographic public key information of the first sink device to the authorized list maintained by the intermediate device comprises associating by the intermediate device of time information with the second cryptographic public key information of the first sink device.

2. The method of claim 1 wherein the first cryptographic public key of the intermediate device comprises a key selection vector (KSV) of the intermediate device and the second cryptographic public key of the first content sink comprises a KSV of the first content sink.

3. The method of claim 1 wherein the step of determining whether the second cryptographic public key information of the first sink device is in the authorized list further comprises determining by the intermediate device whether the second cryptographic public key information of the first sink device meets currency requirements and ending authentication of the first sink device by the intermediate device if the second cryptographic public key information of the first sink device does not meet the currency requirements.

4. The method of claim 1 wherein the first sink device is a display device.

5. The method of claim 1 wherein the intermediate device acts as a sink device for the first source device.

6. The method of claim 5 wherein the intermediate device acts as a source device for the first sink device.

7. The method of claim 1 wherein the step of determining whether the second cryptographic public key information of the first sink device is in the authorized list further comprises determining by the intermediate device whether a maximum device number for the first source device has been exceeded.

8. A method for creating an authorized list of cryptographic public key information by an intermediate device configured to be connected to a first source device and to a plurality of sink devices comprising the steps of:
    for each sink device connected to the intermediate device, receiving by said intermediate device cryptographic public key information of the sink device, providing by the intermediate device a connection between the sink device and the first source device, monitoring by the intermediate device of authentication transactions between the sink device and the first source device, and, upon observing by the intermediate device that the cryptographic public key information of the sink device has been authenticated by the first source device, adding the cryptographic public key information of the sink device by the intermediate device to an authorized list maintained by the intermediate device, the intermediate device propagating cryptographic public key information in the authorized list maintained by the intermediate device to other devices.

9. The method of claim 8 wherein the cryptographic public key information of the sink device comprises a key selection vector (KSV).

10. A method for creating an authorized list of cryptographic public key information by an intermediate device configured to be connected to a first source device and to a plurality of sink devices comprising the steps of:
    for each sink device connected to the intermediate device, receiving by said intermediate device cryptographic public key information of the sink device, providing by the intermediate device a connection between the sink device and the first source device, monitoring by the intermediate device of authentication transactions between the sink device and the first source device, and, upon observing by the intermediate device that the cryptographic public key information of the sink device has been authenticated by the first source device, adding the cryptographic public key information of the sink device by the intermediate device to an authorized list maintained by the intermediate device;

wherein the step of adding the cryptographic public key information of a sink device to the authorized list by the intermediate device comprises associating by the intermediate device of time information with the cryptographic public key information of the sink device in the authorized list.

11. The method of claim 8 further comprising the step of the intermediate device reauthenticating a sink device if the cryptographic public key information of the sink device is found by the intermediate device in the authorized list maintained by the intermediate device after detecting a connection of the sink device to the intermediate device.

12. The method of claim 10 wherein the intermediate device transmits cryptographic public key information contained in the authorized list to the first source device for authentication.

13. The method of claim 12 wherein the intermediate device transmits cryptographic public key information contained in the authorized list to the first source device for authentication during a time during which the first source device is inactive.

* * * * *